(12) United States Patent
Ma et al.

(10) Patent No.: US 10,511,910 B2
(45) Date of Patent: Dec. 17, 2019

(54) SMART HEADPHONE

(71) Applicant: BOE Technology Group Co., Ltd., Beijing (CN)

(72) Inventors: Xitong Ma, Beijing (CN); Ran Duan, Beijing (CN); Lihua Geng, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/021,610

(22) Filed: Jun. 28, 2018

(65) Prior Publication Data

US 2019/0052964 A1 Feb. 14, 2019

(30) Foreign Application Priority Data

Aug. 10, 2017 (CN) .......................... 2017 1 0682434

(51) Int. Cl.
*H04R 5/033* (2006.01)
*H04N 5/232* (2006.01)
(Continued)

(52) U.S. Cl.
CPC ............. *H04R 5/033* (2013.01); *G06F 3/165* (2013.01); *H04N 5/23238* (2013.01);
(Continued)

(58) Field of Classification Search
CPC .. H04R 5/033; H04R 5/0335; H04R 2400/01; H04R 2430/01; H04R 1/10; G06F 3/165;
(Continued)

(56) References Cited

U.S. PATENT DOCUMENTS 8,320,578 B2 * 11/2012 Kahn .................. H04M 1/6066
381/123
9,084,062 B2 7/2015 Endo et al.
(Continued)

FOREIGN PATENT DOCUMENTS

CN 1997161 A 7/2007
CN 101478614 A 7/2009
(Continued)

OTHER PUBLICATIONS

Office Action issued in corresponding Chinese Patent Application No. 201710682434.8, dated Dec. 12, 2018.
(Continued)

*Primary Examiner* — Fan S Tsang
*Assistant Examiner* — Angelica M McKinney
(74) *Attorney, Agent, or Firm* — McDermott Will & Emery LLP (57) ABSTRACT

The present disclosure provides a smart headphone. The smart headphone includes a sensor configured to sense external information, a memory configured to store feature information, and a controller operatively connected to the sensor and the memory, respectively, and the controller is configured to compare the external information sensed by the sensor with the feature information stored in the memory, and to control a playback state of audio information in the smart headphone according to the result of the comparison.

7 Claims, 4 Drawing Sheets

(51) Int. Cl.
*H04R 5/027* (2006.01)
*G06F 3/16* (2006.01)
*H04R 1/10* (2006.01)
*H04N 5/33* (2006.01)

(52) U.S. Cl.
CPC ............. *H04N 5/33* (2013.01); *H04R 1/1091* (2013.01); *H04R 5/027* (2013.01); *H04R 2201/103* (2013.01); *H04R 2400/01* (2013.01)

(58) Field of Classification Search
CPC ...... G06F 21/32; H04N 5/23238; H04N 5/33; G09B 21/008; G09B 21/04; G09B 21/06; G10L 17/06; H03G 3/32; H03G 3/24; G06K 9/00892; G06K 9/00288
See application file for complete search history.

(56) References Cited

U.S. PATENT DOCUMENTS

| | | | | |
|---|---|---|---|---|
| 9,204,214 | B2* | 12/2015 | Usher | H04R 25/02 |
| 9,348,412 | B2* | 5/2016 | Lee | G06F 3/013 |
| 2007/0189544 | A1* | 8/2007 | Rosenberg | G11B 27/105 |
| | | | | 381/57 |
| 2009/0082994 | A1* | 3/2009 | Schuler | A63B 24/00 |
| | | | | 702/160 |
| 2009/0296951 | A1* | 12/2009 | De Haan | H04R 1/10 |
| | | | | 381/74 |
| 2011/0274293 | A1 | 11/2011 | Yue | |
| 2012/0071997 | A1* | 3/2012 | Aliakseyeu | G08G 1/0965 |
| | | | | 700/94 |
| 2012/0128186 | A1 | 5/2012 | Endo et al. | |
| 2013/0246270 | A1* | 9/2013 | Du | G06K 9/00288 |
| | | | | 705/44 |
| 2014/0185828 | A1* | 7/2014 | Helbling | H03G 5/165 |
| | | | | 381/103 |
| 2014/0267642 | A1* | 9/2014 | Wexler | G09B 21/006 |
| | | | | 348/62 |
| 2014/0294257 | A1* | 10/2014 | Tussy | G06F 17/30247 |
| | | | | 382/118 |
| 2015/0172830 | A1* | 6/2015 | Liu | H04R 25/40 |
| | | | | 381/313 |
| 2016/0249126 | A1* | 8/2016 | Konjeti | H04R 1/1041 |
| 2017/0053666 | A1* | 2/2017 | Konjeti | H04M 1/6058 |
| 2017/0195795 | A1* | 7/2017 | Mei | H04R 5/0335 |
| 2018/0121712 | A1* | 5/2018 | Garrett | G06K 9/00228 |
| 2018/0227658 | A1* | 8/2018 | Hviid | H04R 1/1041 |

FOREIGN PATENT DOCUMENTS

| | | |
|---|---|---|
| CN | 102474681 A | 5/2012 |
| CN | 103137155 A | 6/2013 |
| CN | 103702256 A | 4/2014 |
| CN | 104580992 A | 4/2015 |
| CN | 105100635 A | 11/2015 |
| CN | 105159111 A | 12/2015 |
| CN | 105657185 A | 6/2016 |
| CN | 106709402 A | 5/2017 |

OTHER PUBLICATIONS

Office Action issued in corresponding Chinese Patent Application No. 201710682434.8, dated May 15, 2019.

* cited by examiner

SMART HEADPHONE

CROSS-REFERENCE TO RELATED APPLICATION(S)

This application claims priority to Chinese patent application No. 201710682434.8, entitled "SMART HEADPHONE" and filed on Aug. 10, 2017, which is incorporated herein by reference in its entirety.

TECHNICAL FIELD

The present disclosure relates to the field of headphone technology, and in particular, to a smart headphone.

BACKGROUND

In daily life, headphones have been widely used as important electronic accessories. Currently, the common headphones mainly include in-ear headphones and headphones.

Taking the headphone as an example, when a user is using the headphone to listen to a song or listen to a broadcast, the user's ears may hear audio information continuously played back in the headphone. At this time, if someone wants to talk to the user, the audio information continuously played back in the headphone must interfere with the user, so that the user cannot get what others are saying. In this case, the user needs to remove the headphone so as to have a barrier-free conversation with others. In this way, however, the use of the headphone may not be convenient, which thus affects the user's experience.

SUMMARY

In order to at least partially solve or alleviate the above problem, some embodiments according to the present disclosure provide a smart headphone. The smart headphone provided by the present disclosure includes a sensor configured to sense external information; a memory configured to store feature information; and a controller operatively connected to the sensor and the memory, respectively, and configured to compare the external information sensed by the sensor with the feature information stored in the memory, and configured to control a playback state of audio information in the smart headphone according to the result of the comparison.

It is understood that other embodiments and configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

In order to explain the technical solutions in the embodiments of the present disclosure more clearly, drawings needed to be used in description of the embodiments will be briefly described below. Obviously, the drawings in the following description are merely some embodiments of the present disclosure. The skilled in the art may also obtain other drawings based on these drawings without creative labor.

DETAILED DESCRIPTION

To make the above objectives, features, and advantages of the present disclosure more comprehensible, the following describes the technical solutions in the embodiments of the present disclosure clearly and completely with reference to the accompanying drawings in the embodiments of the present disclosure. Obviously, the described embodiments are merely some but not all of the embodiments of the present disclosure. All other embodiments which may be obtained by the skilled in the art based on the embodiments of the present disclosure without creative labor shall fall within the protection scope of the present disclosure.

Figure 1:
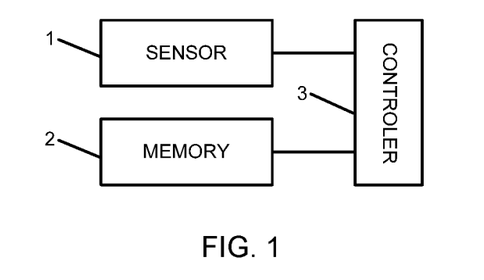
FIG. 1 is a schematic diagram of a connection relationship of a smart headphone according to an embodiment of the present disclosure.

As shown in FIG. 1, the present embodiment provides a smart headphone, which includes a sensor 1, a memory 2, and a controller 3. The sensor 1 is configured to sense external information; the memory 2 is configured to store feature information; and the controller 3 is operatively connected to the sensor and the memory, respectively, and configured to compare the external information sensed by the sensor 1 with the feature information stored in the memory 2, and control a playback state of audio information within the smart headphone according to the result of the comparison.

In the process of the user listening to the audio information using the smart headphone, the sensor 1 senses the external information surrounding the user, and transmits the sensed external information to the controller 3, the controller 3 compares the external information sensed by the sensor 1 with the feature information stored in the memory 2, and when it is determined by the comparison that there is information in the external information which matches the feature information, the controller 3 may control a playback state of the audio information in the smart headphone automatically. Compared to other headphones, the smart headphone provided in the present embodiment may automatically switch the playback status of the audio information, and the user does not need to manually remove the smart headphone, thereby improving the user's experience in using the smart headphone.

In the above embodiment, the sensor 1 may sense the external information in real time, and may also sense the external information in any time as needed. For example, when the user uses the smart headphone indoors, the sensor 1 may sense the external information in real time in order to prevent missing information sent from other person in the room to the user. Accordingly, the controller 3 compares the external information sensed by the sensor 1 in real time with the feature information stored in the memory 2 in real time. For another example, when the user uses the smart headphone in a public place, the sensor 1 may be enabled in actual situations to sense the external information only within a specific period of time, and does not sense the external information during other periods. This may not only save energy of the smart headphone, but also reduce information processed amount in the smart headphone.

Figure 2:
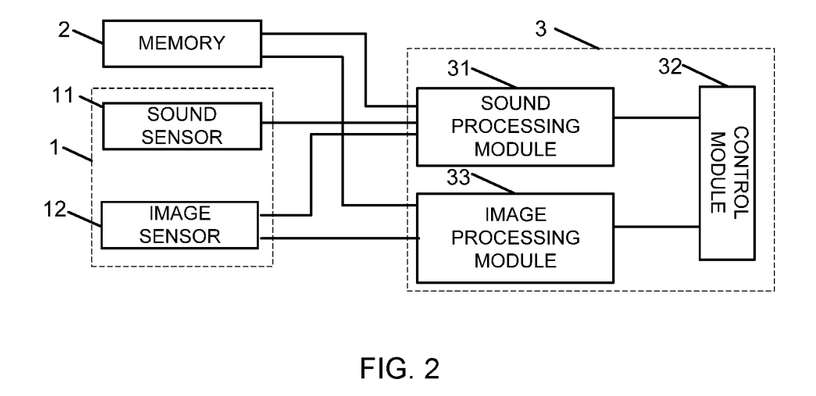
FIG. 2 is a schematic diagram of a connection relationship of a smart headphone according to another embodiment of the present disclosure.

In some embodiments, the external information sensed by the sensor 1 may be external sound information and/or external image information. For example, when the external information sensed by the sensor 1 is the external sound information, the feature information stored in the memory 2 is sound feature information accordingly. As shown in FIG. 2, when the external information sensed by the sensor 1 is the external sound information, the sensor 1 generally includes a sound sensor 11, the controller 3 includes a sound processing module 31 and a control module 32, and the sound processing module 31 is operatively connected to the sound sensor 11, the memory 2 and the control module 32, respectively.

The sound processing module 31 is configured to compare the external sound information sensed by the sound sensor 11 with the sound feature information stored in the memory 2. When the sound processing module 31 determines that the external sound information contains sound matching information that matches the sound feature information, the control module controls the smart headphone to stop the playback of the audio information or to play back the audio information.

Illustratively, the sound feature information may include a first type of sound feature information for identifying a start of conversation and a second type of sound feature information for identifying an end of conversation. The first type of sound feature information may specifically include sound feature information, such as Hello, HI, user's name etc. The second type of sound feature information may specifically include sound feature information, such as Goodbye, BYEBYE, and the like. Of course, the first type of sound feature information and the second type of sound feature information may also include other sound feature information, and may be set according to actual situations.

When the user listens to the audio information using the smart headphone, the sound sensor 11 senses the external sound information. When the sound processing module 31 determines that there is a first type of sound matching information, which matches the first type of sound feature information, in the external sound information sensed by the sound sensor 11, it means that someone wants to start a conversation with the user at this time. Thus, the control module 32 may control the smart headphone to enter a conversation mode, and automatically stop the playback of the audio information. In addition, when the smart phone is in the conversation mode, the sound sensor 11 continues to sense the external sound information. When the sound processing module 31 determines that there is a second type of sound matching information, which matches the second type of sound feature information, in the external sound information sensed by the sound sensor 11, it means that the conversation ends at this time. Thus, the control module 32 may control the smart headphone to exit the conversation mode, so as to continue to play back the audio information automatically.

Further, the sensor 1 may also sense image information. Accordingly, the feature information stored in the memory 2 may also include face image feature information. Referring again to FIG. 2, the sensor 1 further includes an image sensor 12, and the controller 3 further includes an image processing module 33. The image sensor 12 is operatively connected to the sound processing module 31. When the sound processing module 31 determines that the external sound information contains sound matching information that matches the sound feature information, the image sensor 12 is configured to sense the external image information. The image processing module 33 is operatively connected to the memory 2, the image sensor 12, and the control module 32, respectively. The image processing module 33 is configured to compare the external image information sensed by the image sensor 12 with the face image feature information stored in the memory 2.

It can be understood that the face image feature information stored in the memory 2 may include face image information of persons who are acquainted with the user. Illustratively, when the sound processing module 31 determines that the external sound information contains the first type of sound matching information that matches the first type of sound feature information, the image sensor 12 starts to sense the external image information, and the image processing module 33 will compare the external image information sensed by the image sensor 12 with the face image feature information stored in the memory 2. When the image processing module 33 determines that the external image information contains the face image matching information that matches the stored face image feature information, it means that the first type of sound matching information identified by the sound processing module 31 is issued from the person who is acquainted with the user, and thus it is determined that the person who issues the first type of sound matching information wants to have a conversation with the user. At this time, the smart headphone may be controlled by the control module 32 to enter the conversation mode, and stop the playback of the audio information. However, when the image processing module 33 determines that the external image information does not contain the face image matching information that matches the stored face image feature information, it means that the first type of sound matching information identified by the sound processing module 31 is issued from the person who is not acquainted with the user. It means that it is a stranger around the user that is in conversation with others. At this time, the smart headphone does not need to enter the conversation mode, and the control module 32 controls the smart headphone to continue the playback of the audio information.

Similarly, when the sound processing module 31 determines that the external sound information contains the second type of sound matching information that matches the second type of sound feature information, the image processing module 33 may also compare the external image information sensed by the image sensor 12 with the face image feature information stored in the memory 2. When the image processing module 33 determines that the external image information contains the face image matching information that matches the face image feature information, it means that the person who issues the second type of sound matching information has not left yet, and the conversion with the user has not ended. At this time, the control module 32 controls the smart headphone to stop the playback of the audio information. When the image processing module 33 determines that the external image information does not contains the face image matching information that matches the face image feature information, it means that the person who has the conversation with the user has left, and the conversation has ended. At this time, the control module 32 controls the smart headphone to continue to play back the audio information.

When the sensor 1 includes the image sensor 12 and the controller 3 includes the image processing module 33, the external image information may be further compared after the sound processing module 31 determines that the sensed external sound information contains the sound matching information that matches the sound feature information, so that the identity of the person who issues the sound matching information may be further determined, and thus whether the smart headphone needs to enter the conversation mode or exit the conversation mode may be determined more accurately.

Figure 3:
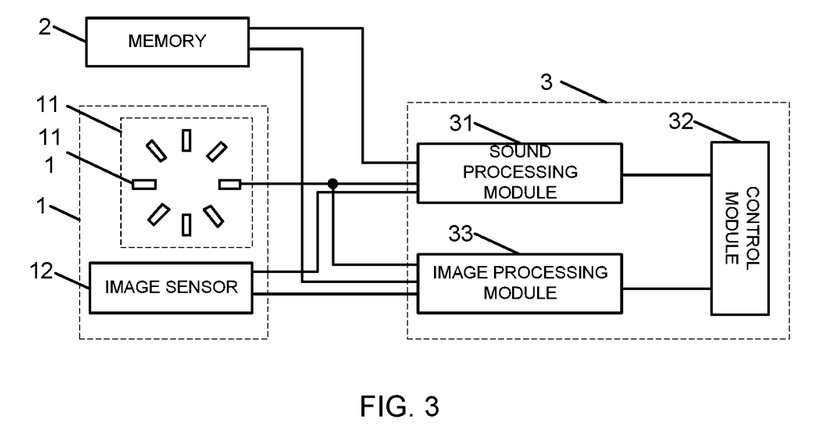
FIG. 3 is a schematic diagram of a connection relationship of a smart headphone according to yet another embodiment of the present disclosure.
Figure 4A:
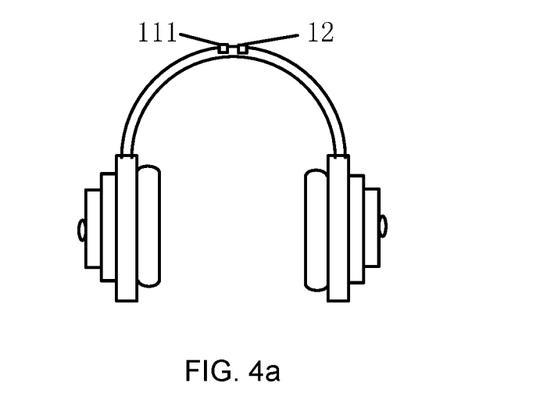
FIG. 4a is a schematic structure diagram of a smart headphone according to an embodiment of the present disclosure.
Figure 4B:
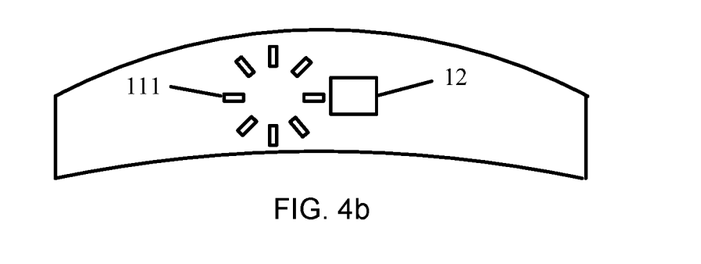
FIG. 4b is another schematic structure diagram of the smart headphone according to the embodiment of the present disclosure.

With reference to the connection diagram of the smart phone as shown in FIG. 3, a front view of the smart phone as shown in FIG. 4a, and a top view of the smart phone as shown in FIG. 4b, in order to sense the external sound information omnidirectionally, the sound sensor 11 may include a plurality of sound sub-sensors 111 arranged on top of the smart headphone in a circular manner for sensing the external sound information omnidirectionally. The plurality of sound sub-sensors 111 are operatively connected to the sound processing module 31. Similarly, the image sensor 12 can also be arranged on top of the smart headphone to sense the external image information omnidirectionally.

When the sound processing module 31 determines that the external sound information contains sound matching information that matches the sound feature information, the image processing module 33 may be enabled to be operatively connected to the plurality of sound sub-sensors 111, in order to control the image sensor 12 to sense the external image information. In this way, the image processing module 33 may determine a position of a sound sub-sensor 111 that has a larger volume of the sensed sound matching information, and thus determine a sound source location of the sound matching information, according to volumes of the sound matching information sensed by the plurality of sound sub-sensors 111; and control the image sensor 12 to sense the external image information at the sound source location according to the determined sound source location.

It should be noted that when the plurality of sound sub-sensors 111 sense the external sound information in real time, the image processing module 33 may determine the sound source location of the sound matching information in real time according to the volumes of the sound matching information sensed in real time by the plurality of sound sub-sensors 111, respectively. That is, the image sensor 12 may also sense the external image information at the sound source location in real time according to the sound source location determined in real time.

Figure 5:
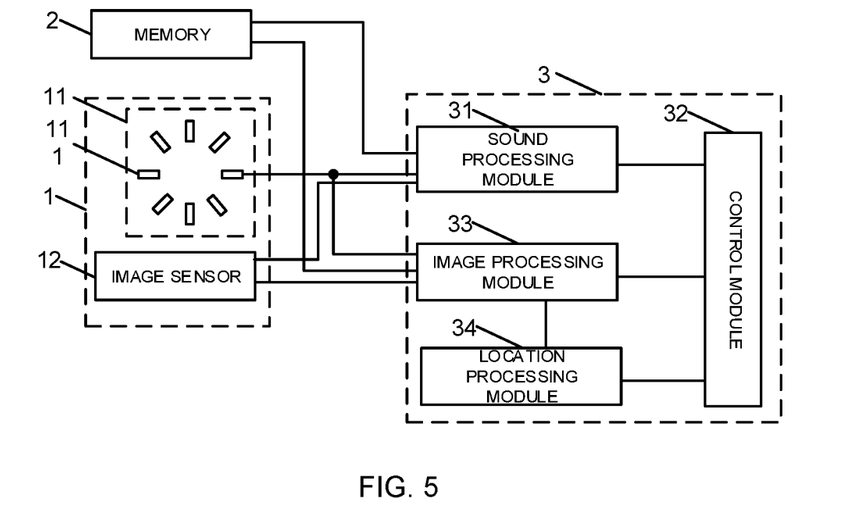
FIG. 5 is a schematic diagram of a connection relationship of a smart headphone provided by yet another embodiment of the present disclosure.

Further, as shown in FIG. 5, the controller 3 may further include a location processing module 34, and the location processing module 34 is operatively connected to the control module 32 and the image processing module 33, respectively.

When the image processing module 33 determines that the external image information sensed by the image sensor 12 contains the face image matching information that matches the face image feature information stored in the memory 2, the location processing module 34 judges whether the relative location between the person corresponding to the face image matching information and the user is within a preset location range, according to the face image matching information identified by the image processing module 33. When it is judged that the relative location between the person corresponding to the face image matching information and the user is within the preset location range, it means that the relative location between the person and the user is in accordance with a relative location which should be in when the two persons are in conversation. Thus, it is further proved that the person is in conversation with the user. At this time, the control module 32 controls the smart headphone to stop the playback of the audio information. When the location processing module 34 judges that the relative location between the person corresponding to the face image matching information and the user exceeds the preset location range, it means that the relative location between the person and the user is not in accordance with the relative location which should be in when the two persons are in conversation. Thus, it is proved that the person is not in conversation with the user. At this time, the control module 32 controls the smart headphone to play back the audio information.

It should be noted that judging whether the relative location between the person corresponding to the face image matching information and the user exceeds the preset location range can be performed by judging whether a relative angle between the face of the person and the face of the user exceeds a preset angle range. For example, when it is identified that the angle between the face of the person and the face of the user is +180°, it means that the person is face-to-face with the user, that is, the person is in front of the user, which is in accordance with the relative location that should be in when the two persons are in conversation. When it is identified that the angle between the face of the person and the face of the user is 0°, it means that the face of the person is towards the back of the user, that is, the person is in rear of the user, which is not in accordance with the relative location that should be in when the two persons are in conversation. The preset angle range may be set according to actual situations, which is not particularly limited in this embodiment.

Figure 6:
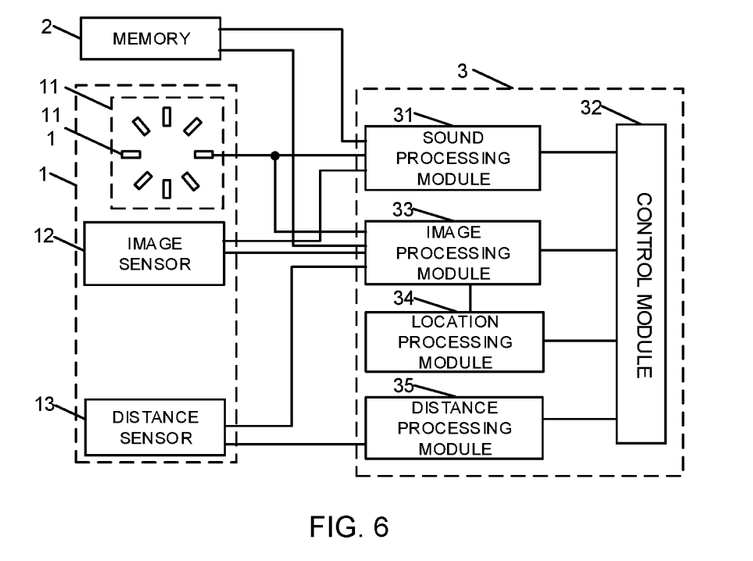
FIG. 6 is a schematic diagram of a connection relationship of a smart headphone provided by yet another embodiment of the present disclosure.

In addition, as shown in FIG. 6, the sensor 1 may further include a distance sensor 13 operatively connected to the image processing module 33. Correspondingly, the controller 3 further includes a distance processing module 35. The distance processing module 35 is operatively connected to the control module 32 and the distance sensor 13, respectively. When the image processing module 33 determines that the sensed external image information contains the face image matching information that matches the stored face image feature information, the distance sensor 13 senses a relative distance between the person corresponding to the face image matching information and the user, according to the face image matching information determined by the image processing module; and the distance processing module 35 judges whether the relative distance sensed by the distance sensor 13 is within a preset distance range.

Illustratively, when the sound processing module 31 determines that the external sound information contains the first type of sound matching information that matches the first type of sound feature information, and the image processing module 33 determines that the sensed external image information contains the face image matching information that matches the stored face image feature information, the distance sensor 13 senses the relative distance between the person corresponding to the face image matching information and the user according to the face image matching information identified by the image processing module 33. When the sound processing module 31 determines that the external sound information contains the second type of sound matching information that matches the second type of sound feature information, if the distance processing module 35 determines that the relative distance between the person corresponding to the face image matching information and the user is within the preset distance range, it means that the conversation between the person and the user has not ended. At this time, the control module 32 controls the smart headphone to stop the playback of the audio information. If the distance processing module 35 determines that the relative distance between the person corresponding to the face image matching information and the user exceeds the preset distance range, it means that the person who has talked with the user has left and the conversation ends. At this time, the control module 32 controls the smart headphone to play back the audio information.

Figure 9:
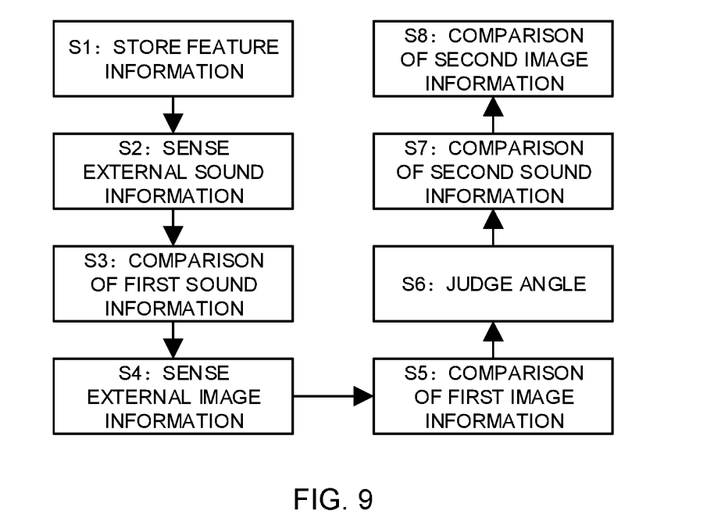
FIG. 9 is a schematic diagram of a control method for a smart headphone according to an embodiment of the present disclosure.

Based on FIG. 6 and FIG. 9, the smart headphone provided in this embodiment will be described below more clearly in conjunction with the control method of the smart headphone.

Step S1 of storing the first type of sound feature information, the second type of sound feature information, and/or the face image feature information in the memory 2 in advance;

Step S2 of sensing the external sound information around the user by the plurality of sound sub-sensors 111;

Step S3 of comparing, by the sound processing module 31, the external sound information sensed by the sound sub-sensors 111 with the first type of sound feature information stored in the memory 2, and proceeding to Step S4 when it is determined that the external sound information contains the first type of sound matching information that matches the first type of sound feature information;

Step S4 of determining, by the image processing module 33, the sound source location of the first type of sound matching information, according to the volumes of the first type of sound matching information respectively sensed by the plurality of sound sub-sensors 111; and controlling the image sensor 12 to sense the external image information at the sound source location, according to the determined sound source location;

Step S5 of comparing, by the image processing module 33, the external image information sensed by the image sensor 12 with the face image feature information stored in the memory 2; controlling, by the control module 32, the audio information within the smart headphone to be in the playback state, when it is determined by comparison that the external image information does not contain the face image matching information that matches the face image feature information; and proceeding to Step S6 when it is determined by comparison that the external image information contains the face image matching information that matches the face image feature information;

Step S6 of judging, by the location processing module 34, whether the angle between the person corresponding to the face image matching information and the user is within the preset angle range, according to the face image matching information identified by the image processing module 33; when it is judged that the angle between the person corresponding to the face image matching information and the user exceeds the preset angle range, controlling, by the control module 32, the smart headphone to play back the audio information; and when it is judged that the angle between the person corresponding to the face image matching information and the user is within the preset angle range, controlling, by the control module 32, the smart headphone to stop the playback of the audio information;

Step S7 of comparing, by the sound processing module 31, the external sound information sensed by the sound sub-sensor 111 with the second type of sound feature information stored in the memory 2; and proceeding to Step S8, when it is determined by comparison that the external sound information contains the second type of sound matching information that matches the second type of sound feature information;

Step S8 of comparing, by the image processing module 33, the external image information sensed by the image sensor 12 with the face image feature information stored in the memory 2; controlling, by the control module 32, the audio information within the smart headphone to be in the stop playback state, when it is determined by comparison that the external image information contains the face image matching information that matches the face image feature information; and controlling, by the control module 32, the audio information within the smart headphone is in the playback state, when it is determined by comparison that the external image information does not contain the face image matching information that matches the face image feature information.

It should be noted that when the sensor 1 includes the distance sensor 13 and the controller 3 includes the distance processing module 35, when it is determined by comparison in Step S5 that the external image information contains the face image matching information that matches the face image feature information, the distance sensor 13 may also sense the relative distance between the person corresponding to the face image matching information and the user according to the face image matching information identified by the image processing module 33.

Correspondingly, Step S8 may also be: judging, by the distance processing module 35, whether the relative distance sensed by the distance sensor 13 is within the preset distance range; when it is judged that the relative distance between the person corresponding to the face image matching information and the user is within the preset distance range, controlling, by the control module 32, the smart headphone to stop the playback of the audio information; and when it is judged that the relative distance between the person corresponding to the face image matching information and the user exceeds the preset distance range, controlling, by the control module 32, the smart headphone to play back the audio information.

It needs to be further noted that the foregoing steps S1 to S8 are merely for the purpose of schematically illustrating the control flow of the smart headphone from entering the conversation mode to exiting the conversation mode, and do not represent a specific limitation on the order of execution of each step.

Figure 7:
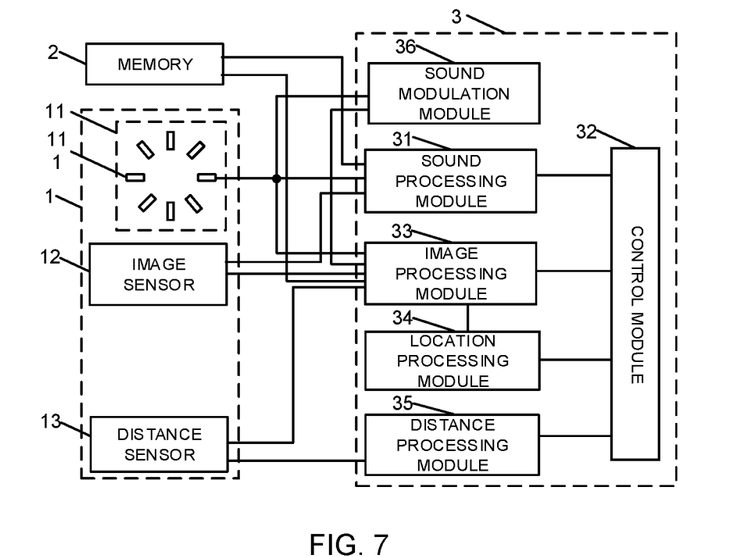
FIG. 7 is a schematic diagram of a connection relationship of a smart headphone provided by yet another embodiment of the present disclosure.

It can be understood that, when the playback of the audio information in the smart headphone stops, the talker's sound information may be transmitted to the user's ear through the plurality of sound sub-sensors 111. Further, as shown in FIG. 7, the controller 3 may further include a sound modulation module 36. The sound modulation module 36 is operatively connected to the image processing module 33 and the plurality of sound sub-sensors 111, respectively. The sound modulation module 36 is configured to modulate the external sound information sensed by the plurality of sound sub-sensors 111 according to the sound source location of the sound matching information determined by the image processing module 33, and transmit the modulated external sound information to the user's ear.

The sound modulating module 36 may modulate the external sound information sensed by the plurality of sound sub-sensors 111 by way of proportional addition. Illustratively, the sound modulation module 36 may increase the volume of the external sound information sensed by the sound sub-sensor 111 at the sound source location according to the sound source location of the sound matching information determined by the image processing module 33; and/or, decrease the volumes of the external sound information sensed by the remaining sound sub-sensors 111, so that the volume of the sound information issued by the talker may be increased compared to a volume of noise in the external sound information, thereby enabling a targeted noise suppressing in the surrounding environment. Thus, the users will not be interfered by the external noise, and quality of the conversation may be improved.

Figure 8:
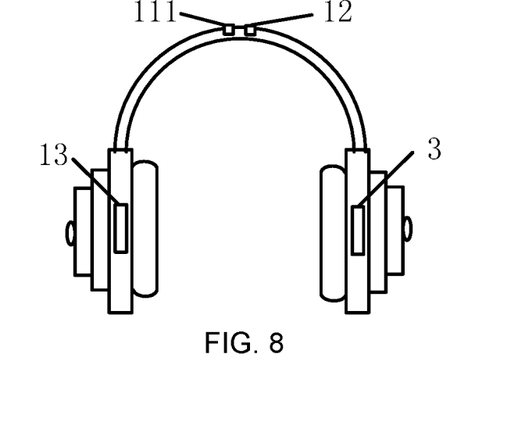
FIG. 8 is a schematic structure diagram of a smart headphone according to another embodiment of the present disclosure.

It should be noted that, as shown in FIG. 8, the smart headphone provided by the present embodiment may include an arc bracket and two earpieces, wherein the two earpieces are detachably provided at both ends of the arc bracket. The sound sub-sensor 111 may be a microphone. The image sensor 12 may be a panoramic camera. The distance sensor 13 may be an infrared detector. The controller 3 may be a Micro Control Unit (MCU) integrated with the sound processing module 31, the control module 32, the image processing module 33, the location processing module 34, the distance processing module 35, and the sound modulation module 36. Among them, the panoramic camera and the plurality of microphones are respectively arranged on top of the arc bracket, so as to realize sensing of the external image information and the external sound information omnidirectionally. The infrared detector and the MCU may be respectively arranged within the two earpieces of the smart headphone, or arranged within the same earpiece of the smart headphone. It should be noted that the respective modules in the controller 3 as described above may be hardware modules, software modules or any combination thereof.

The foregoing descriptions are merely particular implementations of the present disclosure, but the scope of protection of the present disclosure is not limited thereto. Any changes or replacements that can be easily conceived by the skilled in the art within the technical scope disclosed by the present disclosure should be fall within the scope of the present disclosure. Therefore, the protection scope of the present disclosure should be based on the protection scope of the appended claims.

We claim:

1. A smart headphone, comprising:
a sensor configured to sense external information;
a memory configured to store feature information; and
a controller operatively connected to the sensor and the memory, respectively, and configured to compare the external information sensed by the sensor with the feature information stored in the memory, and configured to control a playback state of audio information in the smart headphone according to a result of the comparison,
wherein the sensor comprises a sound sensor and an image sensor, and the feature information comprises sound feature information and face feature information,
wherein the controller is further configured to compare external sound information sensed by the sound sensor with the sound feature information stored in the memory; and
wherein when the controller determines that the external sound information contains sound matching information that matches the sound feature information, the controller is configured to control the smart headphone to stop the playback of the audio information or to play back the audio information,
wherein when the controller determines that the external sound information contains the sound matching information that matches the sound feature information, the image sensor is configured to sense external image information, and the controller is further configured to compare the external image information sensed by the image sensor with the face image feature information stored in the memory;
wherein when the controller determines that the external image information sensed by the image sensor contains face image matching information that matches the face image feature information stored in the memory, the controller is configured to control the smart headphone to stop the playback of the audio information; and
wherein when the controller determines that the external image information sensed by the image sensor does not contain the face image matching information that matches the face image feature information stored in the memory, the controller is further configured to control the smart headphone to play back the audio information.

2. The smart headphone according to claim 1, wherein the sound sensor comprises a plurality of sound sub-sensors arranged on top of the smart headphone in a circular manner, the plurality of sound sub-sensors being configured to sense the external sound information omnidirectionally; the image sensor is arranged on top of the smart headphone, and is configured to sense the external image information omnidirectionally; and
wherein when the controller determines that the external sound information contains the sound matching information that matches the sound feature information, the controller is further configured to determine a sound source location according to volumes of the sound matching information respectively sensed by the plurality of sound sub-sensors; and further configured to control the image sensor to sense the external image information at the sound source location, according to the determined the sound source location.

3. The smart headphone according to claim 2, wherein the sound sub-sensors are microphones, and the image sensor is a panoramic camera.

4. The smart headphone according to claim 2, wherein the sensor further comprises a distance sensor;
wherein when the controller determines that the sensed external image information contains the face image matching information that matches the stored face image feature information, the distance sensor is configured to sense, according to the face image matching information determined by the controller, a relative distance between a person corresponding to the face image matching information and a user of the smart headphone, and the controller is configured to judge whether the relative distance sensed by the distance sensor is within a preset distance range;

wherein when the controller determines that the relative distance is within the preset distance range, the controller is further configured to control the smart headphone to stop the playback of the audio information; and wherein when the controller determines that the relative distance exceeds the preset distance range, the controller is further configured to control the smart headphone to play back the audio information.

5. The smart headphone according to claim 4, wherein the distance sensor is an infrared detector, and the infrared detector is arranged within any of earpieces of the smart headphone.

6. The smart headphone according to claim 2, wherein the controller is further configured to modulate the external sound information sensed by the plurality of sound subsensors according to the sound source location of the sound matching information determined by the controller, and to transmit the modulated external sound information to a user's ears.

7. The smart headphone according to claim 1, wherein when the controller determines that the sensed external image information contains the face image matching information that matches the stored face image feature information, the controller is further configured to determine, according to the face image matching information, whether a relative location between a person corresponding to the face image matching information and a user of the smart headphone is within a preset location range;

wherein when the controller determines that the relative location is within the preset location range, the controller is further configured to control the smart headphone to stop the playback of the audio information; and wherein when the controller determines that the relative location exceeds the preset location range, the controller is further configured to control the smart headphone to play back the audio information.

\* \* \* \* \*